US011358285B2

(12) United States Patent
Moon

(10) Patent No.: US 11,358,285 B2
(45) Date of Patent: Jun. 14, 2022

(54) ROBOT AND METHOD OF RECOGNIZING MOOD USING THE SAME

(71) Applicant: LG ELECTRONICS INC., Seoul (KR)

(72) Inventor: Yoonji Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 344 days.

(21) Appl. No.: 16/575,722

(22) Filed: Sep. 19, 2019

(65) Prior Publication Data

US 2020/0009739 A1   Jan. 9, 2020

(30) Foreign Application Priority Data

Aug. 8, 2019   (KR) .................. 10-2019-0096723

(51) Int. Cl.
| | |
|---|---|
| *G05B 15/00* | (2006.01) |
| *G05B 19/00* | (2006.01) |
| *B25J 11/00* | (2006.01) |
| *B25J 19/02* | (2006.01) |
| *B25J 9/16* | (2006.01) |

(52) U.S. Cl.
CPC ......... *B25J 11/0015* (2013.01); *B25J 9/1697* (2013.01); *B25J 19/023* (2013.01)

(58) Field of Classification Search
CPC .... G06N 3/008; G06N 3/0445; G06N 3/0454; G06N 3/08; G05B 2219/40116; B25J 11/001; B25J 11/0015; B25J 19/023; B25J 9/1697
See application file for complete search history.

(56) References Cited

U.S. PATENT DOCUMENTS

| | | | | |
|---|---|---|---|---|
| 10,061,977 | B1* | 8/2018 | Chang | G06K 9/00335 |
| 2008/0172781 | A1* | 7/2008 | Popowich | G09F 27/00 4/476 |
| 2015/0092038 | A1* | 4/2015 | Jantunen | G06T 1/00 348/77 |
| 2015/0314454 | A1* | 11/2015 | Breazeal | B25J 9/0003 700/259 |
| 2017/0341746 | A1* | 11/2017 | Erickson | G06N 7/005 |
| 2018/0314879 | A1* | 11/2018 | Khwaja | A61B 5/02405 |
| 2019/0193273 | A1* | 6/2019 | Favis | G06F 16/2379 |
| 2019/0240842 | A1* | 8/2019 | Hsu | G06F 3/0304 |
| 2020/0279156 | A1* | 9/2020 | Cai | G06N 3/04 |

FOREIGN PATENT DOCUMENTS

CN   102473264 A   * 5/2012   ............. G06F 3/013

* cited by examiner

*Primary Examiner* — Harry Y Oh
(74) *Attorney, Agent, or Firm* — Ked & Associates LLP

(57) ABSTRACT

A robot includes an output unit including at least one of a display or a speaker, a camera, and a processor configured to control the output unit to output content, to acquire an image including a plurality of users through the camera while the content is output, to determine a mood of a group including the plurality of users based on the acquired image, and to control the output unit to output feedback based on the determined mood.

14 Claims, 11 Drawing Sheets

|  | ANGER | DISPLEASURE | FEAR | HAPPINESS | SADNESS | SURPRISE | NEUTRAL |
|---|---|---|---|---|---|---|---|
| User 1 | 0.1 | 0.1 | 0.1 | 0.5 | 0 | 0.05 | 0.15 |
| User 2 | 0 | 0 | 0 | 0.6 | 0.1 | 0.1 | 0.3 |
| User 3 | 0 | 0.05 | 0.05 | 0.1 | 0.2 | 0.2 | 0.6 |
| User 4 | 0 | 0 | 0.05 | 0.7 | 0 | 0 | 0.1 |
| User 5 | 0.1 | 0.05 | 0.1 | 0.2 | 0.05 | 0.05 | 0.4 |

ROBOT AND METHOD OF RECOGNIZING MOOD USING THE SAME

CROSS-REFERENCE TO RELATED APPLICATION

This application claims the benefit of Korean Patent Application No. 10-2019-0096723, filed on Aug. 8, 2019, which is hereby incorporated by reference as if fully set forth herein.

BACKGROUND OF THE INVENTION

Field of the Invention

The present invention relates to a robot, and more particularly, to a robot and a method of recognizing emotion using the robot for determining a mood of a group including a plurality of users while content is output through the robot.

Discussion of the Related Art

A robot may refer to a machine that automatically processes or operates a given task by its own ability, and robots may be broadly classified into various fields such as industrial robots, medical robots, universe robots, or sea floor robots. In accordance with recent trends, communication robots for communication or interaction with the human through voice, gestures, or the like have increased.

The communication robot includes various types of robots such as a guidance robot that is disposed at a specific place to guide various pieces of information to a user or a home robot in homes. The communication robot may include an education robot for teaching or assisting a learner through an interaction with the learner.

The communication robot may provide various contents according to a user request. For example, the communication robot may output content in the form of graphics through a display. In addition, the communication robot may monitor a user state using a camera, a microphone, or the like during output of content.

SUMMARY OF THE INVENTION

An object of the present invention is to provide a robot for providing appropriate feedback to a plurality of users using content.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a robot includes an output unit including at least one of a display or a speaker, a camera, and a processor configured to control the output unit to output content, to acquire an image including a plurality of users through the camera while the content is output, to determine a mood of a group including the plurality of users based on the acquired image, and to control the output unit to output feedback based on the determined mood.

The processor may recognize emotion of each of the plurality of users based on facial expression information of each of the plurality of users included in the image, and may determine the mood of the group based on the emotion recognized for each of the plurality of users.

In some embodiments, the processor may extract respective face region images of the plurality of users from the image, may input each of the plurality of extracted face region images to an emotion recognizer trained based on deep learning, and may acquire an emotion recognition result of each of the plurality of users from the emotion recognizer.

In some embodiments, the emotion recognition result may include a probability value of each of a plurality of emotion classes, and the processor may recognize an emotion class with a highest probability value among the probability values, as emotion of a user.

The processor may calculate average values of the probability values of the plurality of users with respect to each of the plurality of emotion classes, and may determine an emotion class with a highest average value among the calculated average values, as the mood of the group.

In some embodiments, the processor may detect a first user who performs a reaction among the plurality of users, from the image, may apply a weight to probability values of the detected first user, and may determine the mood of the group based on probability values of the first user to which the weight is applied, and probability values of remaining users.

In some embodiments, the processor may check an emotion deviation of the plurality of users based on an emotion recognition result of each of the plurality of users, and may control the output unit to output feedback with respect to at least one user with the emotion deviation that is higher than a reference deviation.

The robot may further include a communication unit for connection with a server, wherein the processor may transmit the acquired image to the server, may receive mood information of the group from the server, and may control the output unit to output feedback based on the received mood information.

In some embodiments, the feedback may include at least one robot facial expression output through the display in response to the mood, or robot voice output through the speaker in response to the mood.

In some embodiments, the feedback may further include movement of the robot, provided through driving of at least one motor included in the robot, in response to the mood.

In another aspect of the present invention, a method of recognizing a mood using a robot includes outputting content through at least one of a display or a speaker, acquiring an image including a plurality of users through a camera while the content is output, recognizing a mood of a group including the plurality of users based on the acquired image, and outputting feedback based on the recognized mood through at least one of the display or the speaker.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
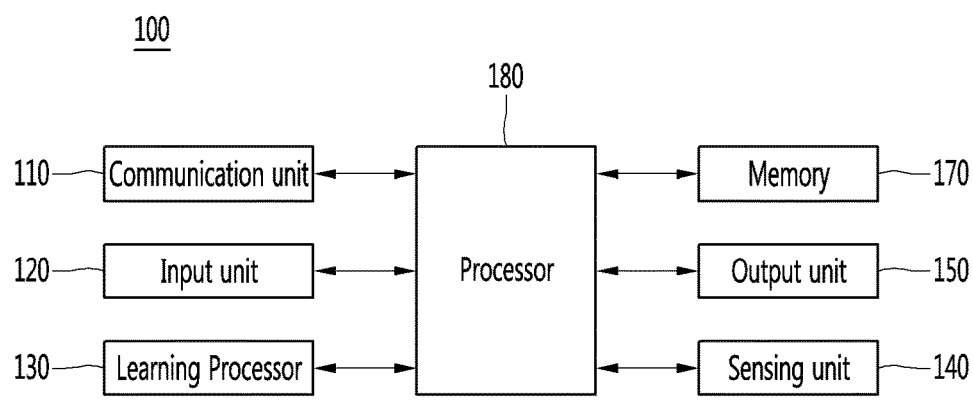
FIG. 1 illustrates an AI device including a robot according to an embodiment of the present invention.

Hereinafter, the present invention will be described in detail by explaining exemplary embodiments of the invention with reference to the attached drawings. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
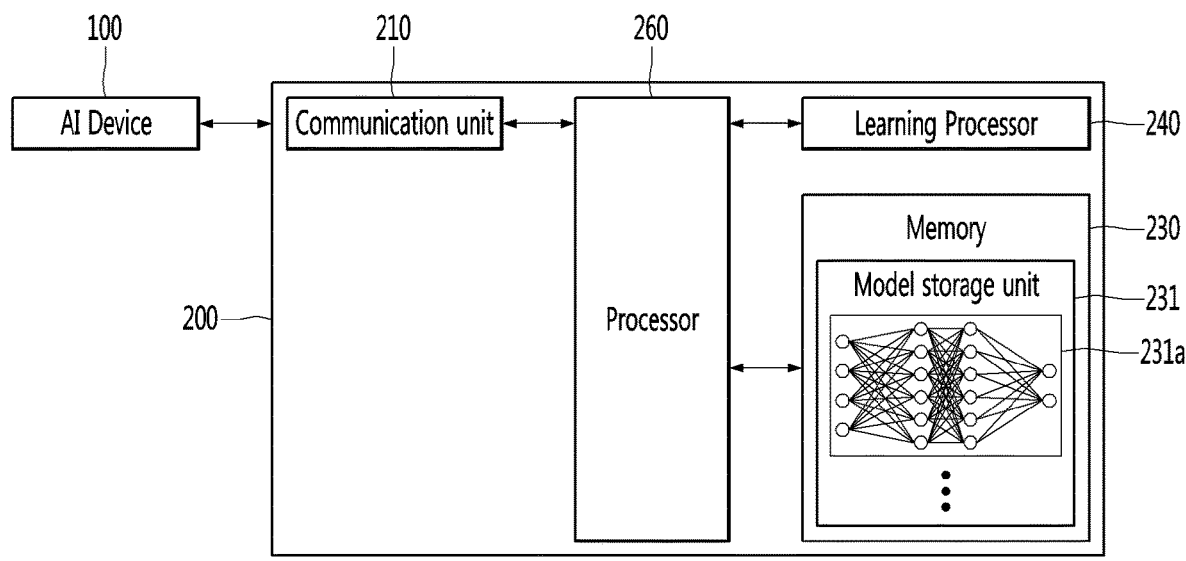
FIG. 2 illustrates an AI server connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or parts of the learning models are implemented in software, one or more instructions that constitute the learning model may be stored in memory 230.

The processor 260 may infer the result value for new input data by using the learning model and may generate a response or a control command based on the inferred result value.

Figure 3:
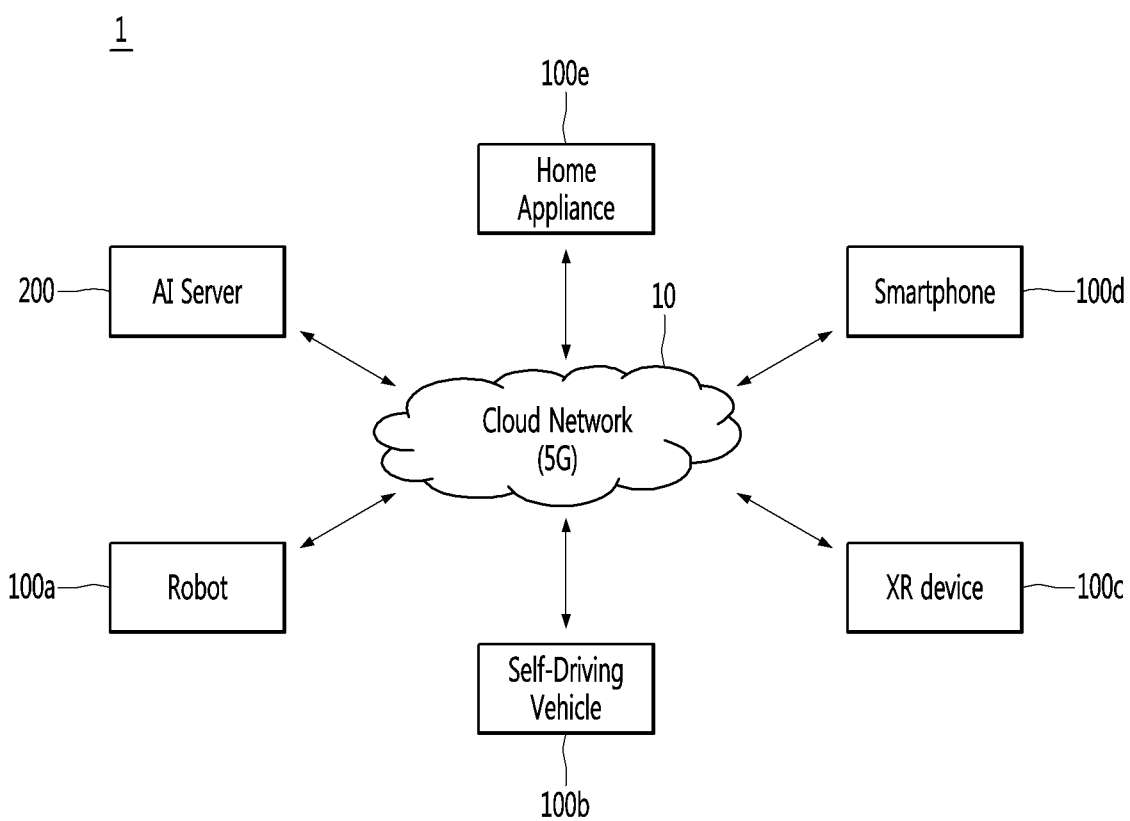
FIG. 3 illustrates an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
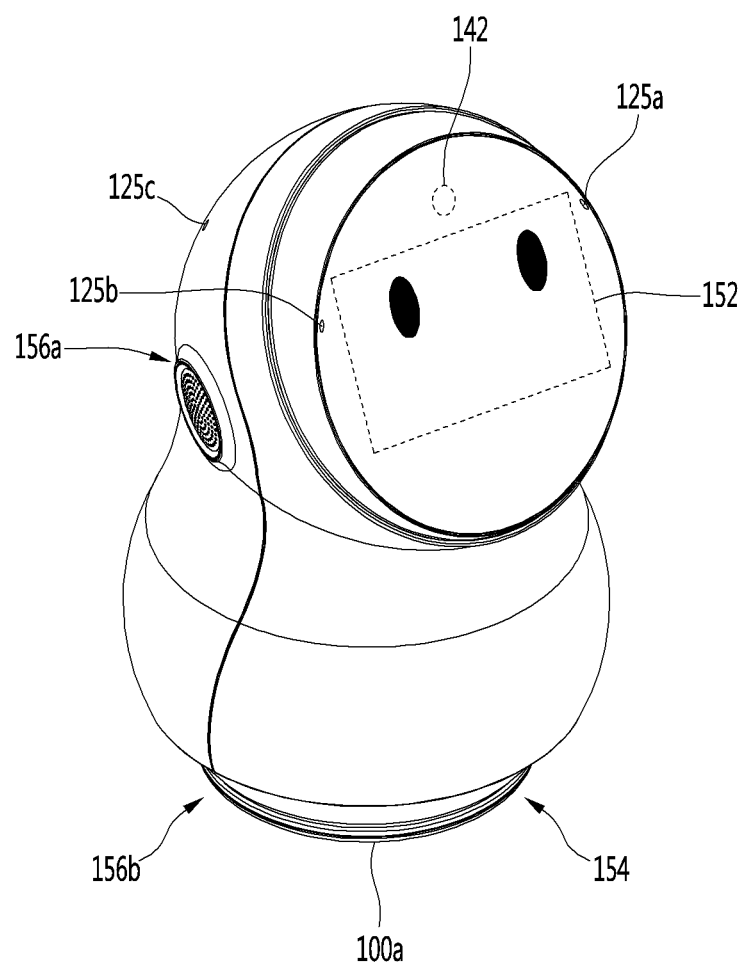
FIG. 4 is a perspective view of a robot according to an embodiment of the present invention.

FIG. 4 is a perspective view of a robot according to an embodiment of the present invention.

Referring to FIG. 4, a robot 100a may correspond to a communication robot for performing an operation of providing information or content or guiding a specific behavior to a user through communication or interaction with the user.

For example, the robot 100a may be a home robot disposed in homes. The home robot may perform an operation of providing various pieces of information or content to a user through an interaction with the user or monitoring an event that occurs in homes.

In order to perform the aforementioned operation, the robot 100a may include input and output devices including a camera 142 for acquiring an image of surrounding of a user or a robot, at least one microphone 124 (refer to FIG. 5) for acquiring user voice, or sound around a robot, a display 152 for outputting graphics or texts, a sound output unit 154 (e.g., a speaker) for outputting voice or sound, and an optical output unit 156 (refer to FIG. 5) for outputting light of color or patterns mapped to a specific event or situation.

The robot 100a may include at least one microphone hole 125a to 125c formed on an external surface of a cover (or a case) in order to smoothly acquire outside sound of a robot through the at least one microphone 124 embodied in the robot 100a. Each of the microphone holes 125a to 125c may be formed at a position corresponding to any one microphone 124, and the microphone 124 may be connected to the outside through the microphone holes 125a to 125c. The robot 100a may include a plurality of microphones that are spaced apart from each other, and in this case, the robot 100a may detect a direction in which sound is generated using the plurality of microphones.

The display 152 may be disposed towards one surface from the robot 100a. Hereinafter, a direction toward which the display 152 is oriented may be defined as a forward direction of the robot 100a. Although the case in which the sound output unit 154 is disposed below the robot 100a is illustrated, a position of the sound output unit 154 may be changed in various forms in some embodiments.

The optical output unit 156 may be embodied as a light source such as a light emitting diode (LED) and may indicate a state, an event, or the like of the robot 100a through change in output patterns. Although FIG. 4 illustrates first optical output units 156a disposed on opposite side surfaces of the robot 100a and a second optical output unit 156b disposed below the robot 100a, the number and arrangement of the optical output units 156 may be changed in various forms.

Although not shown, the robot 100a may further include a moving device (a traveling device) for movement to one position from another position. For example, the moving device may include at least one wheel and a motor for rotating the wheel.

Figure 5:
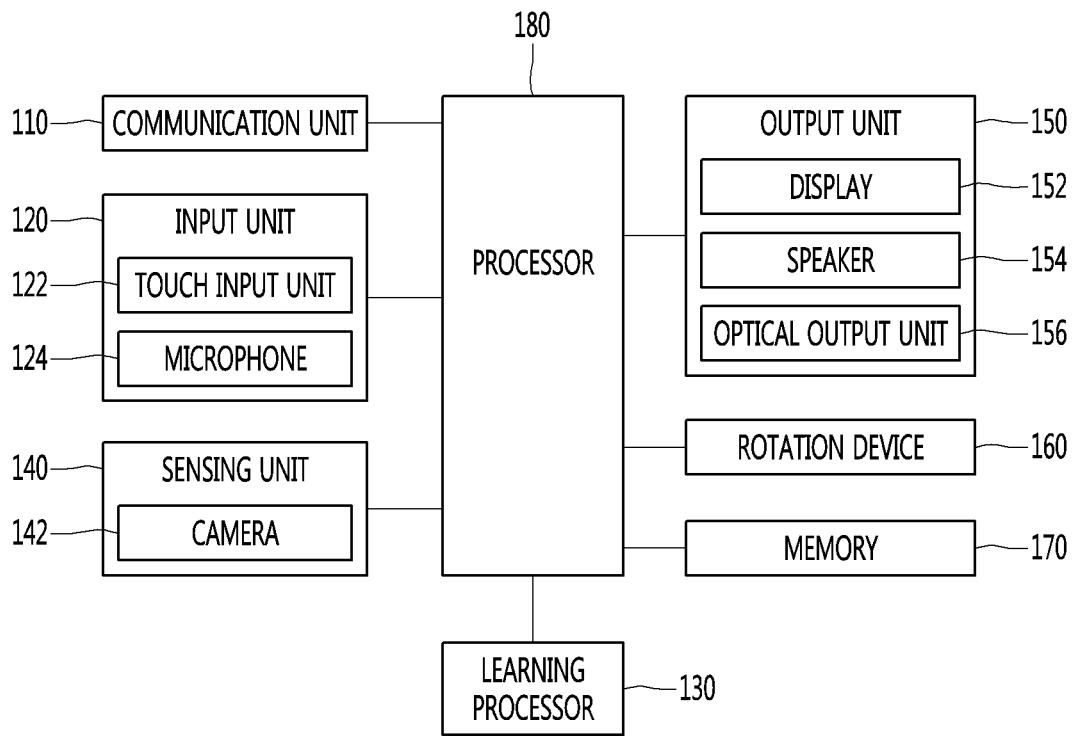
FIG. 5 is a block diagram showing a control configuration of a robot according to an embodiment of the present invention.

FIG. 5 is a block diagram showing a control configuration of a robot according to an embodiment of the present invention.

Referring to FIG. 5, the robot 100a may include a communication unit 110, an input unit 120, a learning processor 130, a sensing unit 140, an output unit 150, a rotation device 160, a memory 170, and a processor 180. The components shown in FIG. 4 are examples for convenience of description, and thus the robot 100a may include greater or fewer components than in FIG. 4.

The description related to the AI device 100 of FIG. 1 may also be applied to the robot 100a according to the present invention, and thus a repetition of the above description of FIG. 1 is omitted.

The communication unit 110 may include communication modules for connecting the robot 100a to a server, a mobile terminal, other robots, or the like through a network. The communication modules may support any one of the communication technologies described above with reference to FIG. 1.

For example, the robot 100a may be connected to a network through an access point such as a router. Accordingly, the robot 100a may provide various pieces of information acquired through the input unit 120, the sensing unit 140, of the like to a server or a mobile terminal through the network. The robot 100a may receive information, data, a command, or the like from the server or the mobile terminal.

The input unit 120 may include at least one input device that acquires various types of data. For example, the at least one input device may include a physical input device such as a button or a dial, a touch input unit 122 such as a touchpad or a touch panel, the microphone 124 for receiving user voice or sound around the robot 100a, or the like. A user may input various requests or commands to the robot 100a through the input unit 120.

The sensing unit 140 may include at least one sensor for sensing various pieces of information of surroundings of the robot 100a. For example, the sensing unit 140 may include the camera 142 and various sensors such as proximity sensor, illumination sensor, touch sensor, and gyro sensor (gyroscope).

The camera 142 may acquire an image of surroundings of the robot 100a. In some embodiments, the processor 180 may acquire an image including a face of a user through the camera 142 or may recognize the user or may acquire a gesture, a face expression, or the like of the user.

The proximity sensor may detect an object such as a user, which approaches the robot 100a. For example, when the proximity sensor detects the user that approaches the same, the processor 180 may output an initial image or initial voice through the output unit 150 and may guide the user to use the robot 100a.

The illumination sensor may detect the brightness of a space in which the robot 100a is disposed. The processor 180 may control components to perform various operations based on the detection result of the illumination sensor and/or information on a time zone.

The touch sensor may detect a part of the human body of the user, which contacts a predetermined region of the robot 100a.

The gyro sensor may a rotation angle, inclination, or the like of the robot 100a. The processor 180 may recognize a direction in which the robot 100a is oriented or shocks from the outside, based on the detection result of the gyro sensor.

The output unit 150 may output various pieces of information or contents related to an operation or state of the robot 100a, various services, programs, or applications executed in the robot 100a, or the like. The output unit 150 may output various messages or information for performing an interaction with a user.

The output unit 150 may include the display 152, a speaker 154, the optical output unit 156, and the like.

The display 152 may output the aforementioned various pieces of information, messages, or contents in the form of graphic. In some embodiments, the display 152 may be embodied in the form of a touchscreen with the touch input unit 122, and in this case, the display 152 may function as an input device as well as an output device.

The speaker 154 may output the various pieces of information, messages, or contents in the form of voice or sound.

The optical output unit 156 may be embodied as a light source such as an LED. The processor 180 may indicate a state or the like of the robot 100a through the optical output unit 156. In some embodiments, the optical output unit 156 may also provide various pieces of information with the display 152 and/or the speaker 154 as an auxiliary output device, to the user.

The rotation device 160 may include a first motor for rotating the robot 100a based on a vertical axis. The processor 180 may control the first motor included in the rotation device 160 to rotate the robot 100a, and thus a direction in which the display 152 and the camera 142 of the robot 100a are oriented may be changed to the left and right directions.

In some embodiments, the rotation device 160 may include a second motor for tilting the robot 100a in forward and backward directions by a predetermined angle. The processor 180 may control the second motor to tilt the robot 100a, and thus may change a direction in which the display 152 and the camera 142 are oriented, to upward and downward directions.

The memory 170 may store various data such as control data for controlling an operation of components included in the robot 100a or data for performing an operation based on input acquired through the input unit 120 or information acquired through the sensing unit 140.

The memory 170 may store program data such as a software module or an application executed by at least one processor or controller included in the processor 180.

The memory 170 may include various storage devices such as ROM, RAM, EPROM, a flash drive, or a hard disk through hardware.

The processor 180 may include at least one processor or controller for controlling an operation of the robot 100*a*. In detail, the processor 180 may include at least one central processing unit (CPU), an application processor (AP), a microcomputer (or MICOM), an integrated circuit, an application specific integrated circuit (ASIC), or the like.

The robot 100*a* may include a UI corresponding to a face of a robot through the display 152 included in a head unit in order to make intimacy or familiarity with a user. The processor 180 may control the display 152 to display a face expression corresponding to emotion related to information, input, a command, or the like acquired through the input unit 120, the sensing unit 140, or the like.

However, conventionally, the robot 100*a* outputs only a face UI that is pre-designed by a manufacturer or the like, and thus a type of a face design provided by the robot 100*a* may be limited.

FIG. 4 is a perspective view of a robot according to an embodiment of the present invention.

Referring to FIG. 4, a robot 100*a* may correspond to a communication robot for performing an operation of providing information or content or guiding a specific behavior to a user through communication or interaction with the user.

For example, the robot 100*a* may be a home robot disposed in homes. The home robot may perform an operation of providing various pieces of information or content to a user through an interaction with the user or monitoring an event that occurs in homes.

In order to perform the aforementioned operation, the robot 100*a* may include input and output devices including a camera 142 for acquiring an image of surrounding of a user or a robot, at least one microphone 124 (refer to FIG. 5) for acquiring user voice, or sound around a robot, a display 152 for outputting graphics or texts, a sound output unit 154 (e.g., a speaker) for outputting voice or sound, and an optical output unit 156 (refer to FIG. 5) for outputting light of color or patterns mapped to a specific event or situation.

The robot 100*a* may include at least one microphone hole 125*a* to 125*c* formed on an external surface of a cover (or a case) in order to smoothly acquire outside sound of a robot through the at least one microphone 124 embodied in the robot 100*a*. Each of the microphone holes 125*a* to 125*c* may be formed at a position corresponding to any one microphone 124, and the microphone 124 may be connected to the outside through the microphone holes 125*a* to 125*c*. The robot 100*a* may include a plurality of microphones that are spaced apart from each other, and in this case, the robot 100*a* may detect a direction in which sound is generated using the plurality of microphones.

The display 152 may be disposed towards one surface from the robot 100*a*. Hereinafter, a direction toward which the display 152 is oriented may be defined as a forward direction of the robot 100*a*. Although the case in which the sound output unit 154 is disposed below the robot 100*a* is illustrated, a position of the sound output unit 154 may be changed in various forms in some embodiments.

The optical output unit 156 may be embodied as a light source such as a light emitting diode (LED) and may indicate a state, an event, or the like of the robot 100*a* through change in output patterns. Although FIG. 4 illustrates first optical output units 156*a* disposed on opposite side surfaces of the robot 100*a* and a second optical output unit 156*b* disposed below the robot 100*a*, the number and arrangement of the optical output units 156 may be changed in various forms.

Although not shown, the robot 100*a* may further include a moving device (a traveling device) for movement to one position from another position. For example, the moving device may include at least one wheel and a motor for rotating the wheel.

FIG. 5 is a block diagram showing a control configuration of a robot according to an embodiment of the present invention.

Referring to FIG. 5, the robot 100*a* may include a communication unit 110, an input unit 120, a learning processor 130, a sensing unit 140, an output unit 150, a rotation device 160, a memory 170, and a processor 180. The components shown in FIG. 4 are examples for convenience of description, and thus the robot 100*a* may include greater or fewer components than in FIG. 4.

The description related to the AI device 100 of FIG. 1 may also be applied to the robot 100*a* according to the present invention, and thus a repetition of the above description of FIG. 1 is omitted.

The communication unit 110 may include communication modules for connecting the robot 100*a* to a server, a mobile terminal, other robots, or the like through a network. The communication modules may support any one of the communication technologies described above with reference to FIG. 1.

For example, the robot 100*a* may be connected to a network through an access point such as a router. Accordingly, the robot 100*a* may provide various pieces of information acquired through the input unit 120, the sensing unit 140, of the like to a server or a mobile terminal through the network. The robot 100*a* may receive information, data, a command, or the like from the server or the mobile terminal.

The input unit 120 may include at least one input device that acquires various types of data. For example, the at least one input device may include a physical input device such as a button or a dial, a touch input unit 122 such as a touchpad or a touch panel, the microphone 124 for receiving user voice or sound around the robot 100*a*, or the like. A user may input various requests or commands to the robot 100*a* through the input unit 120.

The sensing unit 140 may include at least one sensor for sensing various pieces of information of surroundings of the robot 100*a*. For example, the sensing unit 140 may include the camera 142 and various sensors such as proximity sensor, illumination sensor, touch sensor, and gyro sensor (gyroscope).

The camera 142 may acquire an image of surroundings of the robot 100*a*. In some embodiments, the processor 180 may acquire an image including a face of a user through the camera 142 or may recognize the user or may acquire a gesture, a face expression, or the like of the user.

The proximity sensor may detect an object such as a user, which approaches the robot 100*a*. For example, when the proximity sensor detects the user that approaches the same, the processor 180 may output an initial image or initial voice through the output unit 150 and may guide the user to use the robot 100*a*.

The illumination sensor may detect the brightness of a space in which the robot 100*a* is disposed. The processor 180 may control components to perform various operations based on the detection result of the illumination sensor and/or information on a time zone.

The touch sensor may detect a part of the human body of the user, which contacts a predetermined region of the robot 100a.

The gyro sensor may a rotation angle, inclination, or the like of the robot 100a. The processor 180 may recognize a direction in which the robot 100a is oriented or shocks from the outside, based on the detection result of the gyro sensor.

The output unit 150 may output various pieces of information or contents related to an operation or state of the robot 100a, various services, programs, or applications executed in the robot 100a, or the like. The output unit 150 may output various messages or information for performing an interaction with a user.

The output unit 150 may include the display 152, a speaker 154, the optical output unit 156, and the like.

The display 152 may output the aforementioned various pieces of information, messages, or contents in the form of graphic. In some embodiments, the display 152 may be embodied in the form of a touchscreen with the touch input unit 122, and in this case, the display 152 may function as an input device as well as an output device.

The speaker 154 may output the various pieces of information, messages, or contents in the form of voice or sound.

The optical output unit 156 may be embodied as a light source such as an LED. The processor 180 may indicate a state or the like of the robot 100a through the optical output unit 156. In some embodiments, the optical output unit 156 may also provide various pieces of information with the display 152 and/or the speaker 154 as an auxiliary output device, to the user.

The rotation device 160 may include a first motor for rotating the robot 100a based on a vertical axis. The processor 180 may control the first motor included in the rotation device 160 to rotate the robot 100a, and thus a direction in which the display 152 and the camera 142 of the robot 100a are oriented may be changed to the left and right directions.

In some embodiments, the rotation device 160 may include a second motor for tilting the robot 100a in forward and backward directions by a predetermined angle. The processor 180 may control the second motor to tilt the robot 100a, and thus may change a direction in which the display 152 and the camera 142 are oriented, to upward and downward directions.

The memory 170 may store various data such as control data for controlling an operation of components included in the robot 100a or data for performing an operation based on input acquired through the input unit 120 or information acquired through the sensing unit 140.

The memory 170 may store program data such as a software module or an application executed by at least one processor or controller included in the processor 180.

The memory 170 may include various storage devices such as ROM, RAM, EPROM, a flash drive, or a hard disk through hardware.

The processor 180 may include at least one processor or controller for controlling an operation of the robot 100a. In detail, the processor 180 may include at least one central processing unit (CPU), an application processor (AP), a microcomputer (or MICOM), an integrated circuit, an application specific integrated circuit (ASIC), or the like.

Figure 6:
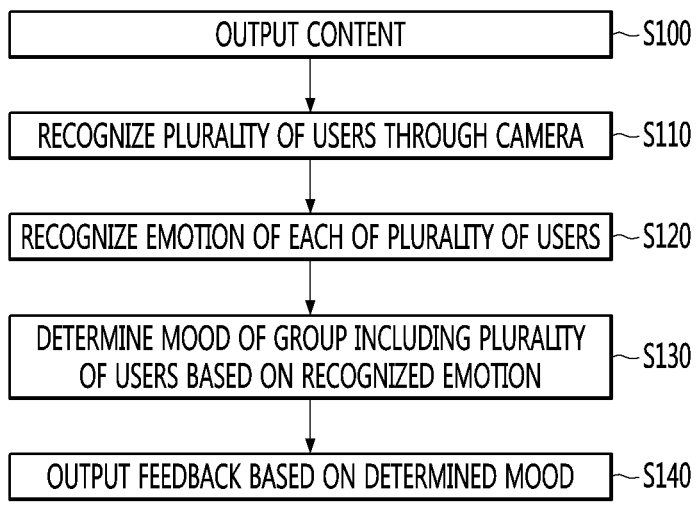
FIG. 6 is a flowchart for explanation of an operation of determining a mood of a group including a plurality of users and providing feedback based on the result using a robot according to an embodiment of the present invention.

FIG. 6 is a flowchart for explanation of an operation of determining a mood of a group including a plurality of users and providing feedback based on the result using a robot according to an embodiment of the present invention.

Referring to FIG. 6, the robot 100a may output content to a plurality of users (S100).

For example, the robot 100a may be an educational robot used by a plurality of users (children, students, or the like). The processor 180 of the robot 100a may output content in the form of graphic and/or sound to the plurality of users through the display 152 and/or the speaker 154.

The robot 100a may recognize a plurality of users through the camera 142 during output of content (S110).

The processor 180 may acquire an image including surroundings of the robot 100a (e.g., a front part of the robot 100a) through the camera 142 during output of content.

For example, the processor 180 may periodically or continuously acquire the image during output of the content.

In some embodiments, the processor 180 may acquire the image at a time point at which a specific event in the content is output, based on data of content that is being output.

The processor 180 may apply various pre-known face recognition algorithms to the acquired and may recognize a plurality of users included in the image. The processor 180m may a plurality of users using various known method, and for example, may distinguish the plurality of users based on the recognition result and may distinguish and identify a plurality of users based on a database stored in the memory 170.

The robot 100a may recognize emotion of each of the plurality of recognized users (S120).

For example, the processor 180 may recognize emotion of each of the plurality of users based on information on facial expression of each of the plurality of users included in the image.

In some embodiments, the processor 180 may recognize emotion of each of the plurality of users included in the image through an emotion recognizer trained based on machine learning.

For example, the emotion recognizer may acquire probability corresponding to each emotion class for a user based on seven emotion classes such as surprise, happiness, sadness, displeasure, anger, fear, and neutrality and may provide an emotion class with the highest probability as the recognition result.

A description of the emotion recognizer will be given below in more detail with reference to FIG. 8.

The robot 100a may determine a mood of a group including a plurality of users based on the recognized emotion (S130).

The processor 180 may determine a mood of a group including the plurality of users based on the emotion recognition result for each of the plurality of users.

The mood may refer to overall atmosphere of the group and may be related to emotion of each of the plurality of users.

For example, the processor 180 may calculate average values of a plurality of users for each of emotion classes and may determine an emotion class with the highest value among the calculated average values as a mood of the group.

The robot 100a may output feedback based on the determined mood (S140).

The processor 180 may output feedback through the output unit 150 based on the determined mood. For example, the feedback may include facial expression of the robot 100a, output through the display 152, or may include voice the robot 100a, output through the speaker 154. In some embodiments, the feedback may further include movement (rotation and/or tilting) of the robot 100a according to driving of the rotation device 160.

That is, the processor 180 may output facial expression or voice of the robot 100*a* according to the determined mood, and thus the immersion or concentrativeness of a plurality of users with respect to content may be increased.

In some embodiments, some of operations illustrated in FIG. 6 may be performed by a server 200*a* connected to the robot 100*a*. An embodiment related to this will be described below with reference to FIG. 7.

Figure 7:
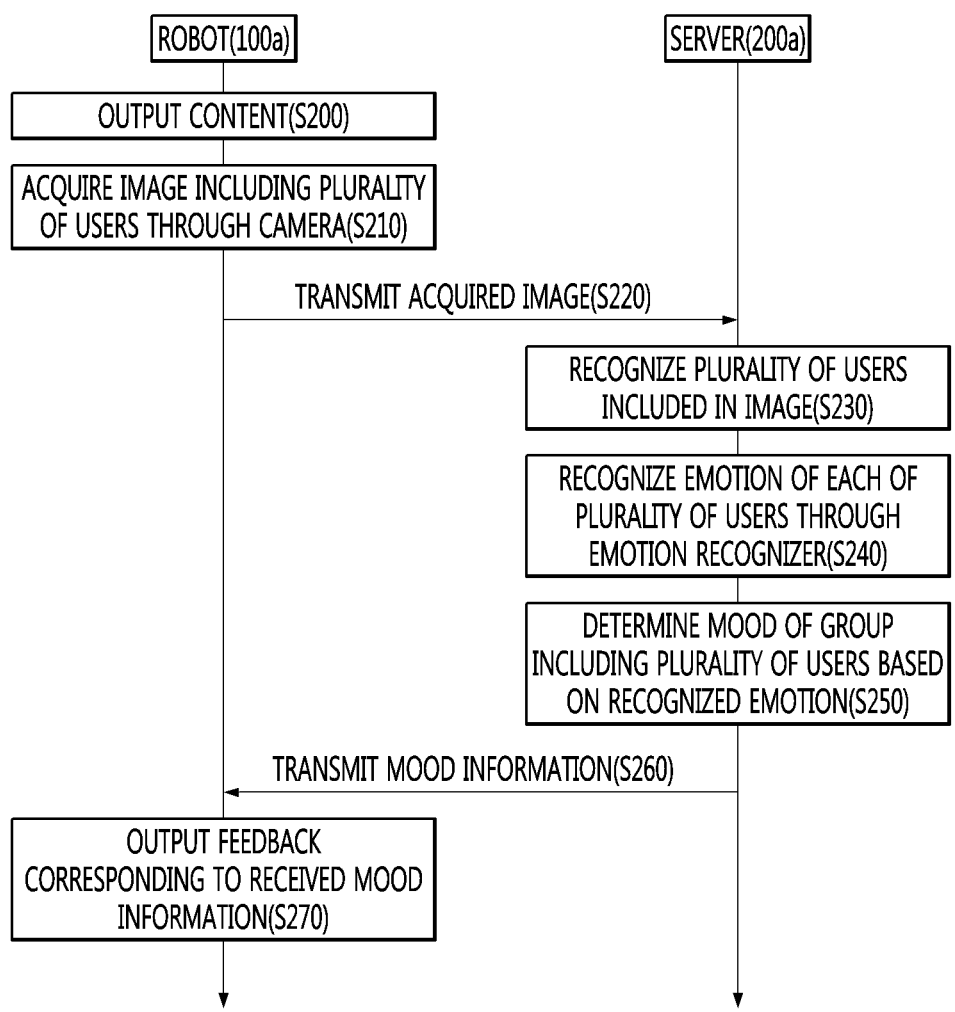
FIG. 7 is a ladder diagram showing an example of an operation performed by a robot and a server connected thereto regard to an operation of determining a group mode and providing feedback in FIG. 6.

FIG. 7 is a ladder diagram showing an example of an operation performed by a robot and a server connected thereto regard to an operation of determining a group mode and providing feedback in FIG. 6.

The server 200*a* may correspond to an example of the AI server 200 described above with reference to FIG. 2. That is, configurations of the AI server 200 shown in FIG. 2 and a description related thereto may also be similarly applied to the server 200*a*.

Referring to FIG. 7, while outputting content (S200), the robot 100*a* may acquire an image including a plurality of users through the camera 142 (S210).

The robot 100*a* may transmit the acquired image to the server 200*a* (S220).

The server 200*a* may recognize a plurality of users included in the received image (S230).

A method or an algorithm for recognizing a plurality of users from the image by the server 200*a* may be substantially the same as the method or the algorithm for recognizing a plurality of users from an image by the robot 100*a* of FIG. 6.

The server 200*a* may recognize emotion of each of the plurality of users through the emotion recognizer (S240).

According to the embodiment shown in FIG. 7, the emotion recognizer may be stored in the memory 230 of the server 200*a*. The processor 260 of the server 200*a* may recognize emotion of each of the plurality of users included in the image using the emotion recognizer.

The server 200*a* may determine a mood of a group including the plurality of users based on the recognized emotion (S250) and may transmit information (mood information) on the determined mood to the robot 100*a* (S260).

In some embodiments, the server 200*a* may transmit data related to feedback or a control signal for outputting the feedback to the robot 100*a* in order to output the feedback based on the determined mood through the robot 100*a*. In this case, the mood information may include the data related to the feedback or the control signal.

The robot 100*a* may output feedback corresponding to the received mood information (S270).

Figure 8:
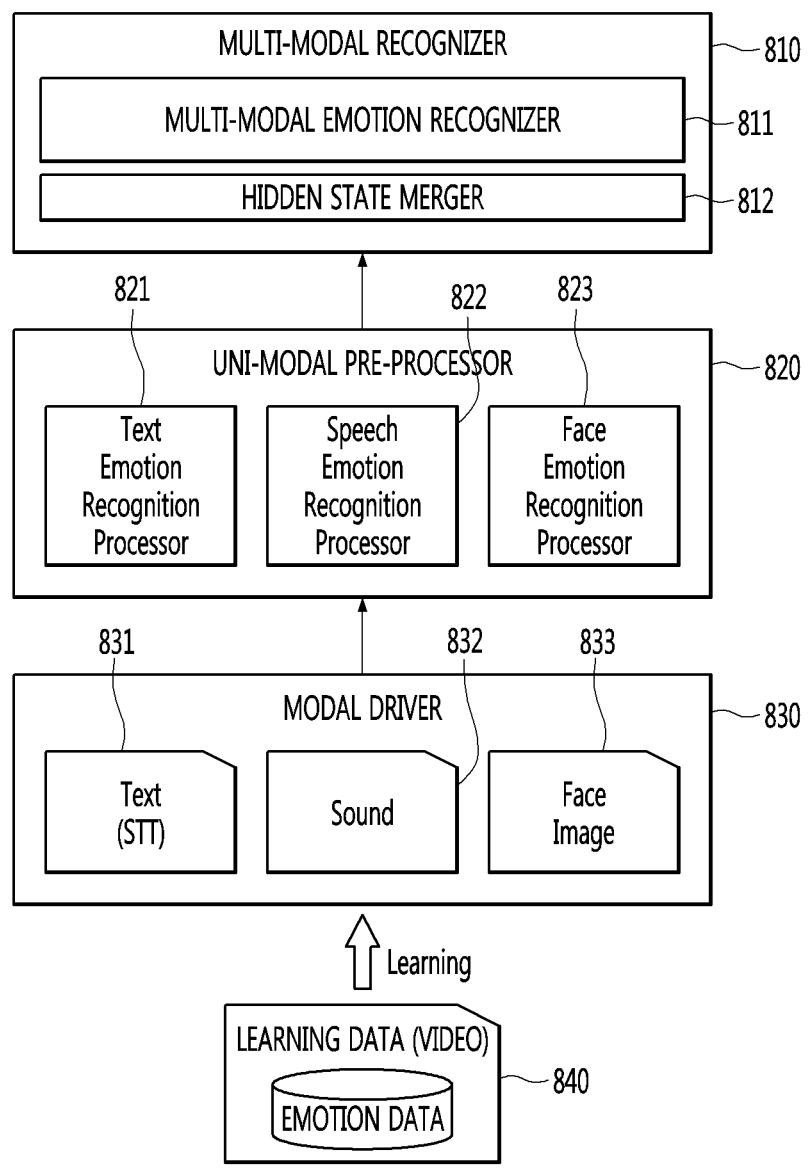
FIG. 8 is a schematic internal block diagram of an emotion recognizer according to an embodiment of the present invention.

FIG. 8 is a schematic internal block diagram of an emotion recognizer according to an embodiment of the present invention.

According to an embodiment of the present invention, the robot 100*a* or the server 200*a* may recognize emotion of each of users using only a face emotion recognizer 823 of an emotion recognizer 800, which recognizes emotion from a face image 833.

However, in some embodiments, the robot 100*a* or the server 200*a* may recognize emotion of each of users in further consideration of voice or the like of each of the users.

Based on this, referring to FIG. 8, the emotion recognizer 800 included in the robot 100*a* or the server 200*a* may perform deep learning using emotion data as input data 840.

The emotion recognizer 800 according to an embodiment of the present invention may include a uni-modal preprocessor 820 including a plurality of recognizers 821, 822, and 823 for respective modals, trained to recognize emotion information of a user included in uni-modal input data, and a multi-modal recognizer 810 trained to combine output data of the plurality of recognizers 821, 822, and 823 for respective modals and to recognize emotion information of a user included in the combined data.

The emotion data may include image, voice, and bio signal data that are emotion information used to recognize emotion as emotion information data having information on emotion of a user. In detail, the input data 840 may be video image data including a user face, and in more detail, the input data 840 may further include sound data including user voice.

Emotion is capability of incurring feeling with respect to a stimulus and temperament of mind of accepting am emotional stimulus or impression and is defined as mixed emotion such as comfortable feeling or uncomfortable feeling through high-dimensional psychological experience inside the human with respect to an environmental change or a physical stimulus from the outside in sensibility ergonomics.

In this specification, emotion may refer to comfortable feeling, uncomfortable feeling, or the like, which occurs with respect to a stimulus, and may be recognized as any one of N representative emotion states. The N representative emotion states may be referred to as emotion classes.

For example, the emotion recognizer 800 may recognize 6 representative emotion classes such as surprise, happiness, sadness, displeasure, anger, and fear, and may output one of the representative emotion classes as the emotion recognition result or may output respective probability values for the 6 representative emotion classes.

Alternatively, emotion recognized and output by the emotion recognizer 800 according to an embodiment of the present invention may further include a neutrality emotion class indicating a default emotion state in which 6 emotions do not occur, in addition to the emotion classes such as surprise, happiness, sadness, displeasure, anger, and fear.

In this case, the emotion recognizer 800 may output any one emotion class selected among surprise, happiness, sadness, displeasure, anger, fear, and neutrality as the emotion recognition result, or may output probability values for respective emotion classes such as surprise x %, happiness x %, sadness x %, displeasure x %, anger x %, fear x %, and neutrality x % as the emotion recognition result.

When emotion to be recognized is recognized as user emotion using an AI model trained via deep learning, a tagging value of data used in training via deep learning may be output as a result value.

In an actual environment, user emotion may not be capable of being lastly output as one emotion. For example, user may express happy emotion through words but may express displeasure emotion through facial expression. As such, people may frequently output different emotions for respective modals such as voice, image, or text.

Accordingly, when user emotion is recognized and one emotion value is lastly output or different emotions, inconsistent emotion, similar emotions, and the like of voice, image, and text are disregarded, different emotions from emotion that a user actually feels may be recognized.

In order to recognize and manage each emotion based on all pieces of information exposed to the outside of the user, the emotion recognizer 800 according to an embodiment of the present invention may recognize emotion for each uni-modal of voice, image, and text and may be configured to also recognize emotion using a multi-modal.

That is, the emotion recognizer 800 according to an embodiment of the present invention may recognize user emotion input at a specific time point for each uni-modal and may simultaneously and multiply recognize the user emotion using a multi-modal.

The plurality of recognizers 821, 822, and 823 for respective modals may each recognize and process one uni-modal input data and may also be each referred to as a uni-modal recognizer.

The emotion recognizer 800 according to an embodiment of the present invention may divide the input data 840 for the respective uni-modals to generate the plurality of uni-modal input data. A modal divider 830 may divide the input data 840 into a plurality of uni-modal input data.

Here, the plurality of uni-modal input data may include image uni-modal input data, voice uni-modal input data, and text uni-modal input data, which are separated from video image data including the user.

For example, the input data 840 may be video image data obtained via photograph of a user, and the video image data may include video data via photograph of a user face and sound data including voice made by the user.

In this case, the modal divider 830 may divide sound data included in the input data 840 into text uni-modal input data 831 obtained via conversion to text data, and sound uni-modal input data 832 of sound data such as a voice tone, a size, or a height.

The text uni-modal input data 831 may be data obtained by converting voice separated from the video image data to a text. Accordingly, the sound uni-modal input data 832 may be a sound source file itself of sound data or a file on which preprocessing is completely performed, for example, noise removal from the sound source file.

The modal divider 830 may separate image uni-modal input data 833 including at least one face image data from voice data included in the input data 840.

The separated uni-modal input data 831, 832, and 833 may be input to the uni-modal pre-processor 820 including the plurality of recognizers 821, 822, and 823 for respective modals, which are trained to recognize emotion information of a user based on each of the uni-modal input data 831, 832, and 833.

For example, the text uni-modal input data 831 may be input to the text emotion recognizer 821 that performs deep learning using a text using learning data.

The sound uni-modal input data 832 may be input to a speech emotion recognizer 822 that performs deep learning using voice learning data.

The image uni-modal input data 833 including one or more face image data may be input to a face emotion recognizer 823 that performs deep learning using image learning data.

The text emotion recognizer 821 may recognize a vocabulary, a sentence structure, or the like included in sound to text (STT) converted to a text to recognize user emotion. For example, as a word related to happiness is used in many times or a word indicating a high degree of happiness is recognized, a probability value for a happiness emotion class is recognized to be higher than a probability for a different emotions class. Alternatively, the text emotion recognizer 821 may immediately output happiness that is an emotion class corresponding to the recognized text as the emotion recognition result.

The text emotion recognizer 821 may output a text feature point vector with the emotion recognition result.

The speech emotion recognizer 822 may extract feature points of input voice data. In this case, the voice feature points may include a tone, a sound volume, a waveform, or the like of voice. The speech emotion recognizer 822 may detect a tone or the like of voice to determine user emotion.

The speech emotion recognizer 822 may also output the emotion recognition result and the detected voice feature point vectors.

The face emotion recognizer 823 may detect a user face region from the input image data and may recognize facial expression landmark point information as feature points configuring the facial expression to recognize user facial expression. The face emotion recognizer 823 may output an emotion class corresponding to the recognized facial expression or a probability value for each emotion class and may also output a face feature point (a facial expression landmark point) vector.

The plurality of recognizers for respective modals may include an artificial neural network corresponding to an input feature of each input uni-modal input data. In addition, a multi-modal emotion recognizer 811 may also include an artificial neural network corresponding to the feature of input data.

For example, the face emotion recognizer 823 that performs learning and recognition based on an image may include a convolutional neural network (CNN), different emotions recognizers 821 and 822 may include a deep neutral network (DNN), and the multi-modal emotion recognizer 811 may include an artificial neural network of a recurrent neural network (RNN).

The plurality of recognizers 821, 822, and 823 for respective modals may recognize emotion information included in the uni-modal input data 831, 832, and 833 that are respectively input thereto to output the emotion recognition result. For example, the plurality of recognizers 821, 822, and 823 for respective modals may output an emotion class with the highest probability among a predetermined number of preset emotion classes as the emotion recognition result or may output probability values for respective emotion classes as the emotion recognition result.

The plurality of recognizers 821, 822, and 823 for respective modals may learn and recognize a text, voice, and an image in each deep learning structure and may derive an intermediate vector value including a feature point vector for each uni-modal.

The multi-modal recognizer 810 may perform multi-modal deep learning using an intermediate vector value of each of voice, an image, and a text.

As such, input of the multi-modal recognizer 810 is generated based on the plurality of recognizers 821, 822, and 823 for respective modals, and thus the plurality of recognizers 821, 822, and 823 for respective modals may operate as a type of pre-processor.

The emotion recognizer 800 according to an embodiment of the present invention may use 4 of total deep learning models including 3 deep learning models of the plurality of recognizers 821, 822, and 823 for respective modals and 1 deep learning model of the multi-modal recognizer 810.

The multi-modal recognizer 810 may include a merger 812 for combining feature point vectors output by the plurality of recognizers 821, 822, and 823 for respective modals, and the multi-modal emotion recognizer 811 trained to recognize emotion information of the user included in output data of the merger 812.

Here, the merger 812 may synchronize output data of the plurality of recognizers 821, 822, and 823 for respective modals to each other, may perform vector concatenation on feature point vectors, and may output the result to the multi-modal emotion recognizer 811.

The multi-modal emotion recognizer 811 may recognize emotion information of a user from the input data and may output the emotion information as the emotion recognition result.

For example, the multi-modal emotion recognizer 811 may output an emotion class with the highest probability among a predetermined number of preset emotion classes as the emotion recognition result or may output probability values for respective emotion classes as the emotion recognition result.

Accordingly, the emotion recognizer 800 according to an embodiment of the present invention may output a plurality of uni-modal emotion recognition results and one multi-modal emotion recognition result.

The emotion recognizer 800 according to an embodiment of the present invention may output a plurality of uni-modal emotion recognition results and one multi-modal emotion recognition result as levels (probabilities) for respective emotion classes.

For example, the emotion recognizer 800 may output probability values for respective emotion classes of surprise, happiness, neutrality, sadness, displeasure, anger, and fear, and as a probability value is increased, this means that the probability of the recognized emotion class is high. Here, the sum of probability values of 7 emotion classes may be 100%.

The emotion recognizer 800 may output a multi-emotion recognition result including the emotion recognition result of each of the plurality of recognizers 821, 822, and 823 for respective modals and the emotion recognition result of the multi-modal emotion recognizer 811.

Accordingly, the robot 100*a* may provide emotional-exchanged user experience (UX) based on 3 uni-modal emotion recognition results and 1 multi-modal emotion recognition result.

According to settings, the emotion recognizer 800 may output the recognition result that occupies the largest part among the multi emotion recognition result, and the recognition result with the highest probability value, as the last recognition result. Alternatively, the processor 180 of the robot 100*a* or the processor 260 of the AI server 200, which receives the plurality of emotion recognition results, may determine the last recognition result according to a predetermined standard.

The emotion recognizer 800 according to the present invention may recognize and manage emotion of each of voice (voice tone or the like), an image (facial expression or the like), and a text (information of a word or the like) as a level. Accordingly, emotional exchange user experience (UX) may be differently processed for respective modals.

The emotion recognition result for each uni-modal (voice, image, text) and a multi-modal emotion recognition result value may be simultaneously output at one time. The voice, the image, and the text which are input at one time may be recognized as multi-emotion, and thus inconsistent emotion for each uni-modal may be recognized from the multi-modal emotion to recognize emotion tendency of a user. Accordingly, even if negative input is output from some modal, overall emotion may be recognized and emotional exchange user experience (UX) corresponding to position input as an actual emotion state of the user may also be provided.

According to the present invention, the robot 100*a* may include the emotion recognizer 800 or may communicate with the AI server 200 including the emotion recognizer 800 to recognize emotion for each modal only for the user.

The emotion recognizer 800 may analyze the emotion pattern only for the user and may recognize emotion for each modal to use the result in emotion care (treatment).

In a conventional emotion method, in the case of inconsistent emotion with different recognition results for each modal of input data, it is very difficult to map emotions to one emotion and to analyze the emotion.

However, the emotion recognizer 800 may process emotion to be most appropriate for various situations in an actual life through a plurality of inputs and outputs.

In order to compensate for an input recognizer with low performance, the emotion recognizer 800 may be configured as a recognizer structure in which the plurality of recognizers 811, 821, 822, and 823 compensate for each other, via fusion of a plurality of inputs and outputs.

The emotion recognizer 800 according to an embodiment of the present invention may divide voice into sound and meaning and may make 3 of total inputs of an image, voice (sound), and STT from the input of an image and voice.

In order to achieve optimum performance for each of the 3 inputs, the emotion recognizer 800 may be configured to have different artificial neural network models for respective inputs, such as a convolutional neural network (CNN), a long short-term memory (LSTM), and the like. For example, the face emotion recognizer 823 may have a CNN structure, and the multi-modal emotion recognizer 811 may have a long short-term memory (LSTM) structure. Accordingly, a customized neural network may be configured according to each input feature.

Output of the uni-modal recognizers 821, 822, and 823 for each input may be a probability value for 7 emotion classes and vector values of feature points that appropriately express the corresponding emotion.

The multi-modal recognizer 810 may not simply calculate emotion values for 3 inputs using a statistical method, but instead, may combine the vector values of feature points that appropriately express the corresponding emotion with entirely coupled layers through an LSTM, and thus other recognizers help in a problem in which the recognizer has difficulty to facilitate enhancement in performance, thereby covering various cases in an actual life.

For example, even if only a word is heard in a place in which it is difficult to recognize a face, the emotion recognizer 800 according to an embodiment of the present invention may be configured in such a way that the voice-based recognizers 821 and 822 and the multi-modal emotion recognizer 811 recognize user emotion.

The emotion recognizer 800 may fuse the recognition result and the multi-modal recognition result for each of image, voice, and text data to recognize a multi-emotion state of the user, and thus it may be possible to recognize emotion for various situations in an actual life.

FIGS. 9 to 13 are diagrams related to embodiments of FIGS. 6 and 7.

Figure 9:
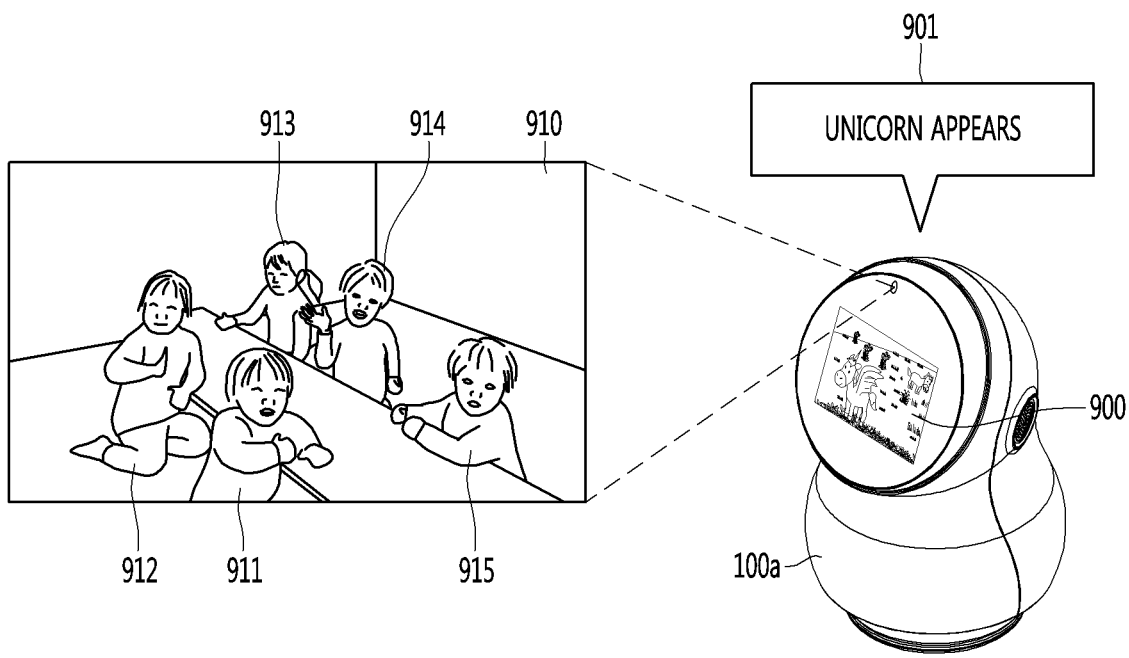
FIGS. 9 to 13 are diagrams related to embodiments of FIGS. 6 and 7.
Figure 10:
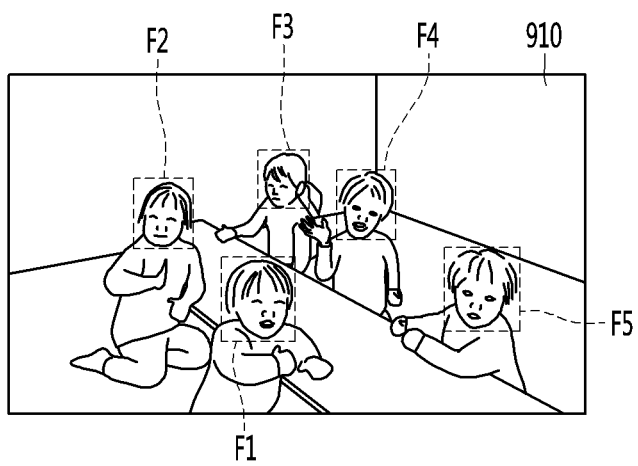

Referring to FIGS. 9 and 10, the processor 180 of the robot 100*a* may acquire an image 910 including a plurality of users 911 to 915 through the camera 142 during output of contents 900 and 901.

The processor 180 may recognize the plurality of users 911 to 915 from the acquired image 910 using various pre-known face recognition algorithms.

In detail, the processor 180 may detect face regions F1 to F5 including a face of each of the plurality of users 911 to 915, and thus may recognize the plurality of users 911 to 915 from the image 910.

In some embodiments, when identification information on the plurality of users 911 to 915 is present in the memory 170, the processor 180 may identify the plurality of recognized users 911 to 915.

The processor 180 may recognize emotion of each of the plurality of recognized users 911 to 915.

For example, the processor 180 may extract the detected face regions F1 to F5 and may input each of images corresponding to the extracted face regions F1 to F5 to the emotion recognizer 800.

Figures 11, 12:
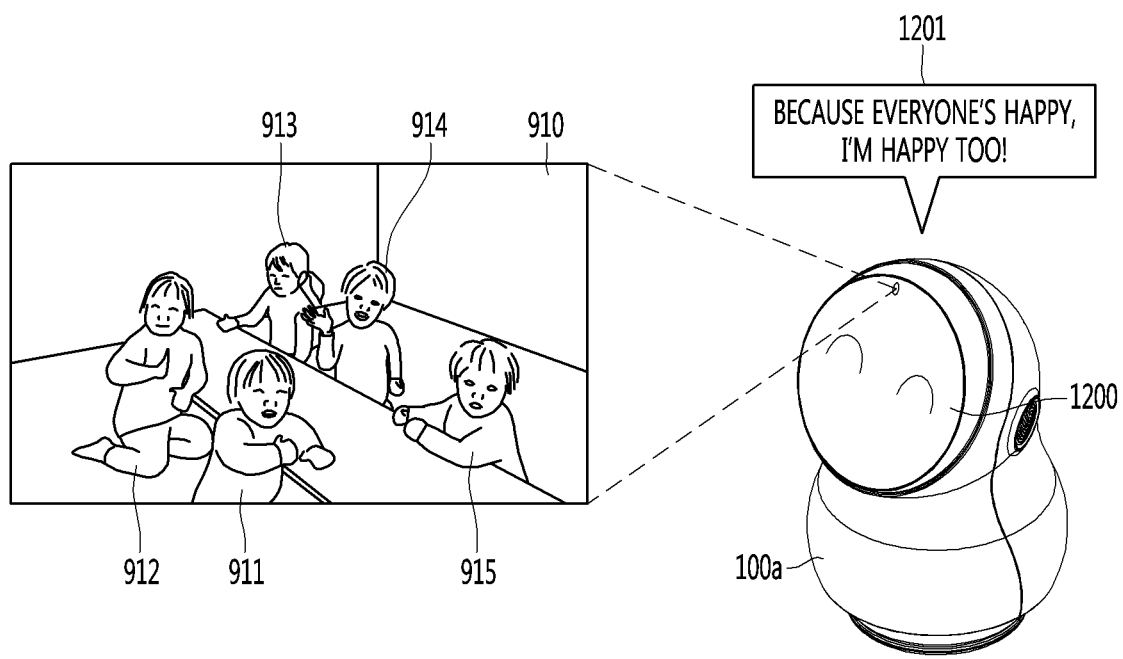

Referring to an example of FIG. 11, the processor 180 may acquire respective probability values of a plurality of emotion classes with respect to each of the plurality of users 911 to 915 and may recognize emotion of each of the plurality of users 911 to 915 based on the acquired probability values, using the emotion recognizer 800.

The emotion recognizer 800 may recognize emotion corresponding to each of the extracted face regions F1 to F5 through the face emotion recognizer 823. For example, the emotion recognizer 800 may output a probability value of each a plurality of emotion classes (e.g., anger, displeasure, fear, happiness, sadness, surprise, and neutrality) as the emotion recognition result, with respect to each of the face regions F1 to F5.

The processor 180 may recognize an emotion class with the highest probability value as emotion of a corresponding user.

For example, the processor 180 may recognize emotion of a first user 911, a second user 912, and a fourth user 914 as 'happiness', and may recognize emotion of a third user 913 and a fifth user 915 as 'neutrality'.

The processor 180 may determine a mood of a group including the users F1 to F5 based on the emotion recognition result of the users F1 to F5.

For example, the processor 180 may calculate average values of probability values of the users F1 to F5 for emotion classes. The processor 180 may determine an emotion class with the highest average value among average values calculated for each of the emotion classes as a mood of the group.

According to the embodiment shown in FIG. 11, since a probability value of an emotion class corresponding to 'happiness' is highest, the processor 180 may determine a mood of the group as a mood corresponding to 'happiness'.

Referring to FIG. 12, the processor 180 may output feedback based on the determined mood.

For example, the processor 180 may output facial expression 1200 corresponding to 'happiness' through the display 152. The processor 180 may output a voice message 1201 corresponding to 'happiness' through the speaker 154.

Figure 13:
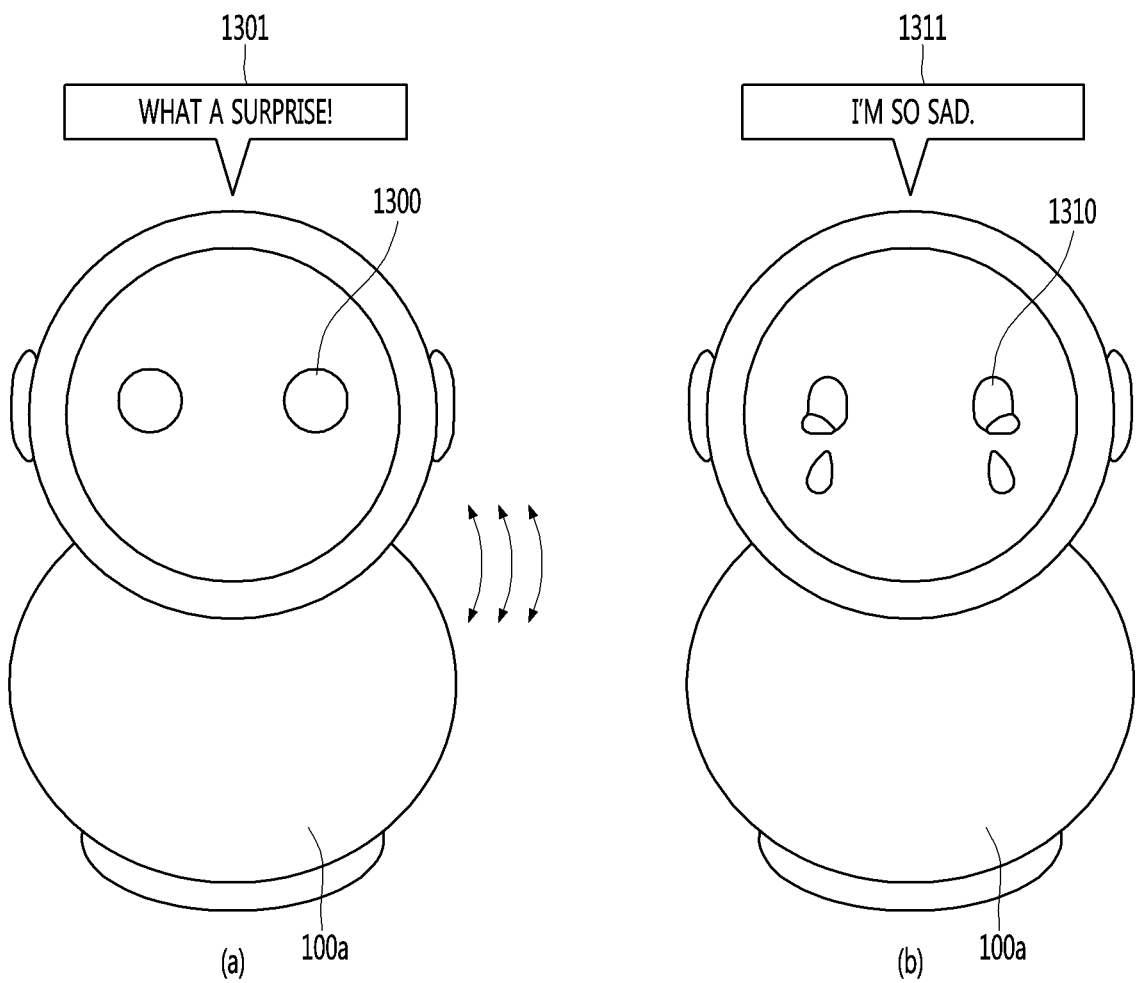

Referring to FIG. 13, the processor 180 may output various different feedbacks according to the determined mood.

Referring to FIG. 13A, when the determined mood corresponds to 'surprise', the processor 180 may output facial expression 1300 corresponding to 'surprise' through the display 152. The processor 180 may output a voice message 1301 corresponding to 'surprise' through the speaker 154.

In some embodiments, the processor 180 may control the rotation device 160 to perform movement corresponding to 'surprise'.

Referring to FIG. 13B, when the determined mood corresponds to 'sadness', the processor 180 may output facial expression 1310 corresponding to 'sadness' through the display 152. In addition, the processor 180 may output a voice message 1311 corresponding to 'sadness' through the speaker 154.

That is, according to the embodiment shown in FIGS. 6 to 13, the robot 100a (or the server 200a) may recognize emotion of users with respect to content provided through the robot 100a and may output feedback appropriate for a mood of a group based on the recognized emotion. Accordingly, concentrativeness or immersion of users of the group with respect to content may be increased. As the robot 100a outputs feedback in the form of being sympathized with a mood of the group, users may strongly feel intimacy or fellowship with respect to the robot 100a and the utilization of the robot 100a may be enhanced.

In some embodiments, the facial expression or voice message corresponding to the mood may be present in a plural number, and the processor 180 may output an arbitrary facial expression or voice message among the plurality of facial expressions or voice messages to provide various irregular feedbacks.

Figure 14:
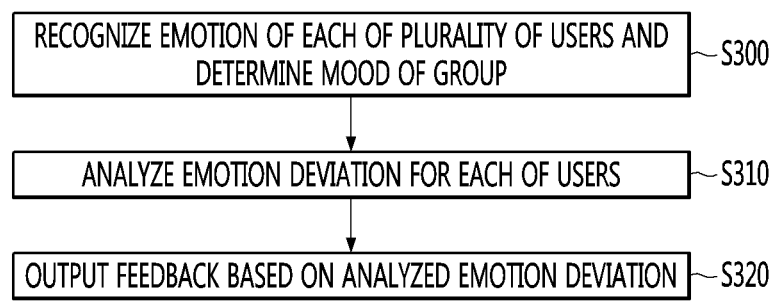
FIG. 14 is a flowchart for explanation of an operation of providing feedback to a specific user among a plurality of users included in a group using a robot according to an embodiment of the present invention.
Figure 15:
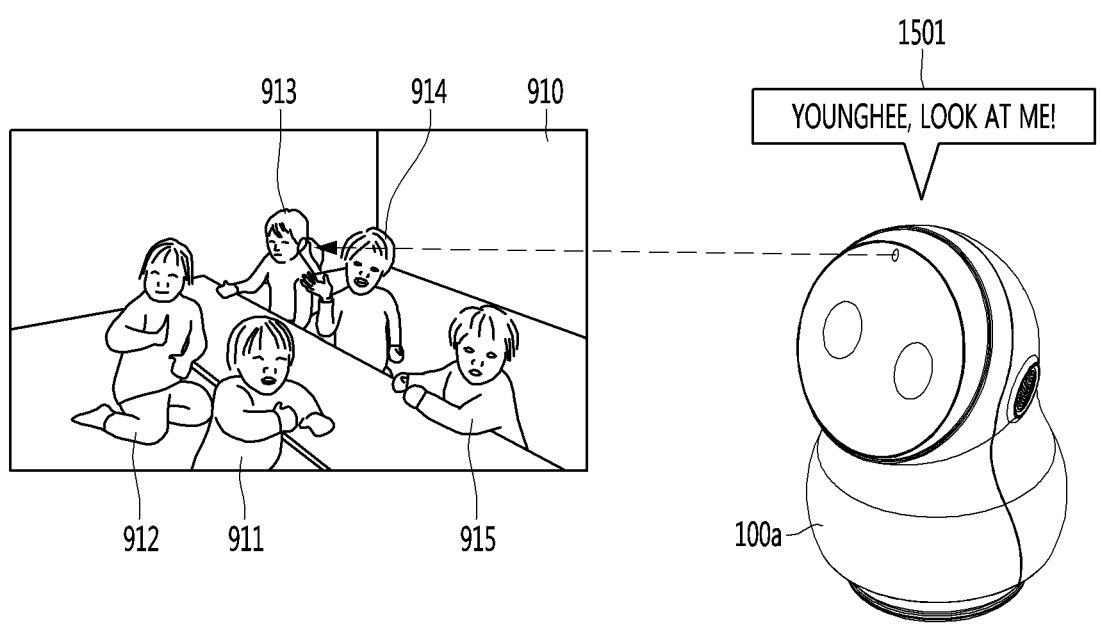
FIG. 15 is a diagram showing an example related to the embodiment of FIG. 14.

FIG. 14 is a flowchart for explanation of an operation of providing feedback to a specific user among a plurality of users included in a group using a robot according to an embodiment of the present invention. FIG. 15 is a diagram showing an example related to the embodiment of FIG. 14.

Referring to FIG. 14, the robot 100a or the server 200a may recognize emotion of each of the plurality of users and may determine a mode of a group (S300).

A description of operation S300 has been given above with reference to FIGS. 6 and 7, and thus is omitted here.

The robot 100a or the server 200a may analyze an emotion deviation with respect to each of the plurality of users (S310).

The processor 180 or 260 may analyze the emotion deviation of the plurality of users based on the emotion recognized with respect to each of the plurality of users.

For example, the processor 180 or 260 may identify at least one user with emotion deviation greater than a reference deviation from the recognition result shown in FIG. 11.

For example, the processor 180 or 260 may identify a user with a probability of an emotion class determined as the mood of the group, which is less than the reference value, as a user with the emotion deviation greater than the reference deviation.

In addition, the processor 180 or 260 may identify a user with a probability greater than a reference value among probability values of emotion classes that are not determined as the mood of the group, as a user with the emotion deviation greater than the reference deviation. The processor 180 or 260 may identify a user with an emotion deviation greater than the reference deviation using various other methods.

According to the embodiment of FIG. 11, an emotion deviation of the third user 913 may be greater than the reference deviation.

Based on the analysis result, the robot 100a may output feedback to at least one user among the plurality of users (S320).

The probability that a user with a higher emotion deviation than the reference deviation corresponds to a user with low concentrativeness with respect to content that is being output by the robot 100a may be high.

Accordingly, the processor 180 may output feedback for guiding concentration on content with respect to the user with the emotion deviation higher than the reference deviation.

For example, as shown in FIG. 15, the processor 180 may output a voice message 1501 for calling attention of the third user 913 and guiding concentration through the speaker 154.

When the voice message 1501 is output, the processor 180 may temporally stop content that is being pre-provided, but the present invention is not limited thereto.

The third user 913 may listen to the output voice message 1501, and thus may concentrate on content provided by the robot 100a.

That is, according to the embodiment shown in FIGS. 14 to 15, the robot 100a may being capable of estimating content concentration state of a specific user based on the emotion recognition result of the plurality of users, and thus may call attention of the corresponding user and may guide the user to concentrate on content. Accordingly, the robot 100a may more effectively provide content to the plurality of users.

Figure 16:
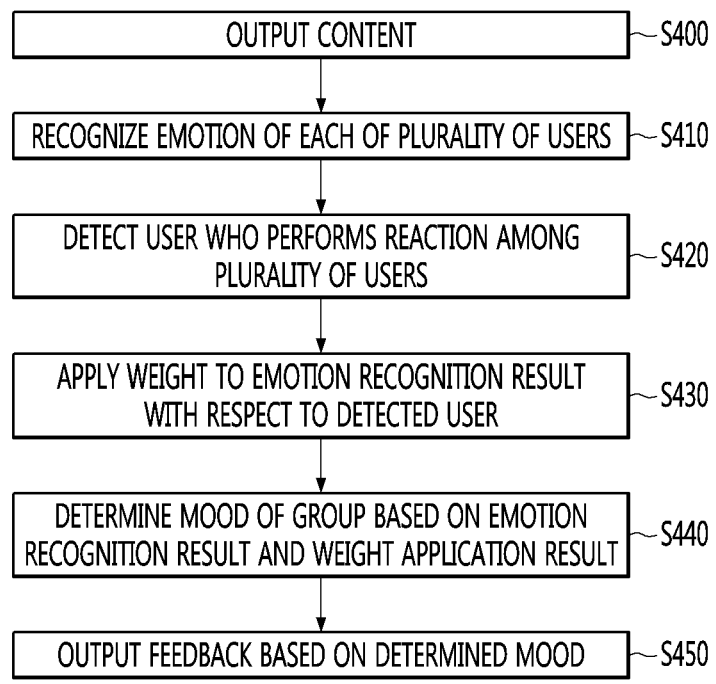
FIG. 16 is a flowchart for explanation of an operation of determining a mood of a group including a plurality of users and providing feedback based on the result using a robot according to an embodiment of the present invention.

FIG. 16 is a flowchart for explanation of an operation of determining a mood of a group including a plurality of users and providing feedback based on the result using a robot according to an embodiment of the present invention.

Referring to FIG. 16, operations S400 to S410 may be substantially the same as operations S100 to S120 of FIG. 6 or operations S200 to S240 of FIG. 7, and thus a description thereof is omitted.

The robot 100a or the server 200a may detect a user who performs a reaction among the plurality of recognized users (S420).

The processor 180 or 260 may detect the user who performs the reaction from the image acquired through the camera 142 of the robot 100a.

The reaction may refer to a predetermined behavior of the user, and for example, may include a gesture, an utterance, or the like.

For example, the processor 180 or 260 may analyze hand movement or movement of a part of a human body included in the acquired image, and thus may detect whether a user gesture is performed.

In addition, the processor 180 or 260 may analyze a mouth shape or movement of a mouth of a user included in the acquired image, and thus may detect whether the user makes an utterance. In some embodiments, the processor 180 or 260 may further use voice data acquired through a microphone 124 of the robot 100a to detect whether the user makes an utterance.

The processor 180 or 260 may also detect only the user who performs a reaction related to content that is being output. For example, the processor 180 or 260 may not detect the user as a user who performs a reaction when a user who does not see the display 152 of the robot 100a performs the reaction.

The robot 100a or the server 200a may apply a weight to the emotion recognition result corresponding to the detected user (S430) and may determine the mode of the group based on the emotion recognition result of operation S410 and the application result of the weight (S440).

The user who performs the reaction may have high concentrativeness or immersion with respect to content compared with other users. In addition, the user who performs the reaction may be a user who leads an overall mode of a group.

Accordingly, the processor 180 or 260 may apply a weight to the emotion recognition result of the detected user. For example, in the exemplary diagrams shown in FIGS. 9 to 12, when a first user is detected to perform a reaction, the processor 180 or 260 may add or multiply a weight to a probability value of each of emotion classes of the first user shown in the table of FIG. 11 to increase the probability values.

As a result, when the mood of the group is determined, a ratio of the emotion recognition result of the first user may be increased.

The robot 100a may output feedback based on the determined mood (S450).

That is, according to the embodiment shown in FIG. 16, the robot 100a or server 200 may apply a weight to the emotion recognition result of a user who performs a predetermined reaction among users of the group to determine a mood of the group, and thus may more accurately determine the mood of the group.

According to embodiments of the present invention, a robot may recognize emotion of users with respect to content that is being output and may output feedback appropriate for a mood of a group based on the recognized emotion. Accordingly, the concentrativeness or the immersion of the users of the group with respect to content may be more increased.

As the robot outputs feedback in the form of being sympathized with a mood of the group, users may strongly feel intimacy or fellowship with respect to the robot and the utilization of the robot may be enhanced.

While this invention has been particularly shown and described with reference to exemplary embodiments thereof, it will be understood by those skilled in the art that various changes in form and details may be made therein without departing from the spirit and scope of the invention as defined by the appended claims.

Accordingly, the exemplary embodiments should be considered in descriptive sense only and not for purposes of limitation.

The scope of the invention is defined not by the detailed description of the invention but by the appended claims, and all differences within the scope will be construed as being included in the present invention.

What is claimed is:

1. A robot comprising:
   an output unit including at least one of a display or a speaker;
   a camera; and
   a processor configured
      to control the output unit to output content,
      to acquire an image of a plurality of users through the camera while the content is output,
      to determine a mood of a group including the plurality of users based on the acquired image, and
      to control the output unit to output feedback based on the determined mood,
   wherein the processor recognizes an emotion of each of the plurality of users based on facial expression information of each of the plurality of users included in the acquired image, and determines the mood of the group based on the emotion recognized for each of the plurality of users,
   wherein the processor extracts respective face region images of the plurality of users from the acquired image, inputs each of the plurality of extracted face region images to an emotion recognizer trained based on deep learning, and acquires an emotion recognition result of each of the plurality of users from the emotion recognizer,
   wherein the emotion recognition result includes a probability value of each of a plurality of emotion classes,
   wherein, for each of the plurality of users, the processor recognizes one of the emotion classes with a highest probability value among the probability values, as the emotion of the user, and wherein the processor checks emotion deviations of the plurality of users based on the emotion recognition results of the plurality of users, and controls the output unit to output feedback with respect to one of the users with one of the emotion deviations that is greater than a reference deviation.

2. The robot of claim 1, wherein the processor calculates average values of the probability values of the plurality of users with respect to each of the plurality of emotion classes, and determines an emotion class with a highest average value among the calculated average values, as the mood of the group.

3. The robot of claim 2, wherein the processor detects a first user who performs a reaction among the plurality of users, from the image, applies a weight to probability values of the detected first user, and determines the mood of the group based on probability values of the first user to which the weight is applied, and probability values of remaining users.

4. The robot of claim 1, further comprising a communication unit for connection with a server,
wherein the processor transmits the acquired image to the server, receives mood information of the group from the server, and controls the output unit to output feedback based on the received mood information.

5. The robot of claim 1, wherein the feedback includes at least one robot facial expression output through the display in response to the mood, or robot voice output through the speaker in response to the mood.

6. The robot of claim 5, wherein the feedback further includes movement of the robot, provided through driving of at least one motor included in the robot, in response to the mood.

7. A method of recognizing a mood using a robot, the method comprising:
outputting content through at least one of a display or a speaker;
acquiring an image of a plurality of users through a camera while the content is being output;
recognizing a mood of a group including the plurality of users based on the acquired image; and
outputting feedback based on the recognized mood through one or more of the display or the speaker,
wherein recognizing the mood of the group includes:
recognizing an emotion of each of the plurality of users based on facial expression information of each of the plurality of users included in the acquired image; and
recognizing the mood of the group based on the emotion recognized for each of the plurality of users,
wherein recognizing the emotion of each of the plurality of users includes:
extracting respective face region images of the plurality of users from the acquired image;
inputting each of the plurality of extracted face region images to an emotion recognizer trained based on deep learning; and
acquiring an emotion recognition result of each of the plurality of users from the emotion recognizer,
wherein each of the emotion recognition results includes a probability value of each of a plurality of emotion classes, and recognizing the emotion of each of the plurality of users includes recognizing one of the emotion classes with a highest value among the probability values as the emotion of the user, and
wherein the outputting feedback includes checking an emotion deviation of the plurality of users based on the emotion recognition result of each of the plurality of users, and outputting feedback with respect to at least one user with the emotion deviation that is higher than a reference deviation.

8. The method of claim 7, further comprising:
transmitting the acquired image to a computing device;
receiving mood information of the group from the computing device, and
controlling the output unit to output feedback based on the received mood information.

9. The method of claim 7, wherein outputting the feedback includes at least one of:
outputting a robot facial expression through the display in response to the mood, or
outputting a robot voice through the speaker in response to the mood.

10. The method of claim 9, wherein outputting the feedback includes driving of at least one motor included in the robot to move the robot in response to the mood.

11. A robot comprising:
an output unit including at least one of a display or a speaker;
a camera; and
a processor configured to control the output unit to output content, to acquire an image including a plurality of users through the camera while the content is output, to determine a mood of a group including the plurality of users based on the acquired image, and to control the output unit to output feedback based on the determined mood,
wherein the processor recognizes an emotion of each of the plurality of users based on facial expression information of each of the plurality of users included in the acquired image, and determines the mood of the group based on the emotion recognized for each of the plurality of users,
wherein the processor extracts respective face region images of the plurality of users from the acquired image, inputs each of the plurality of extracted face region images to an emotion recognizer trained based on deep learning, and acquires an emotion recognition result of each of the plurality of users from the emotion recognizer,
wherein the emotion recognition result includes a probability value of each of a plurality of emotion classes,
wherein, for each of the plurality of users, the processor recognizes one of the emotion classes with a highest probability value among the probability values, as the emotion of the user,
wherein the processor calculates average values of the probability values of the plurality of users with respect to each of the plurality of emotion classes, and determines one of the emotion classes with a greatest average value among the calculated average values as the mood of the group, and
wherein the processor detects, from the acquired image, a first user among the plurality of users who performs a reaction, applies a weight to the probability value of the detected first user, and determines the mood of the group based on the probability value of the first user to which the weight is applied and the probability values of remaining ones of the users.

12. The robot of claim 11, further comprising a communication unit for connection with a server,
wherein the processor transmits the acquired image to the server, receives mood information of the group from the server, and controls the output unit to output feedback based on the received mood information.

13. The robot of claim 11, wherein the feedback includes at least one of:
a robot facial expression output through the display in response to the mood, or
a robot voice output through the speaker in response to the mood.

14. The robot of claim 13, wherein the feedback further includes a movement of the robot, provided through driving of at least one motor included in the robot, in response to the mood.

* * * * *